United States Patent [19]

Ikedo et al.

[11] 4,379,621
[45] Apr. 12, 1983

[54] IMAGE DISPLAY DEVICE UTILIZING BIREFRINGENCE PROPERTIES OF FERROELECTRIC CERAMIC MATERIAL

[75] Inventors: Masaru Ikedo, Neyagawa; Masafumi Watari, Moriguchi; Yoshitake Yasuno, Kyoto; Tadaoki Yamashita, Hirakata, all of Japan

[73] Assignee: Matsushita Electric Industrial Company, Limited, Osaka, Japan

[21] Appl. No.: 202,658

[22] Filed: Oct. 31, 1980

[30] Foreign Application Priority Data

Nov. 1, 1979 [JP] Japan ............................... 54-142642
Nov. 15, 1979 [JP] Japan ............................... 54-148417

[51] Int. Cl.³ .................................................. G02F 1/03
[52] U.S. Cl. ...................................... 350/392; 350/384; 358/236
[58] Field of Search ............... 350/392, 390, 393, 384, 350/404, 333, 336; 358/61, 232, 236

[56] References Cited

U.S. PATENT DOCUMENTS

| | | | |
|---|---|---|---|
| 3,737,211 | 6/1973 | Cutchen et al. | 350/392 |
| 3,774,989 | 11/1973 | Takahashi | 350/336 |
| 3,840,695 | 10/1974 | Fischer | 350/392 |
| 3,903,358 | 9/1975 | Roese | 350/392 |
| 4,113,352 | 9/1978 | Schafft | 350/392 |

*Primary Examiner*—R. A. Rosenberger
*Attorney, Agent, or Firm*—Lowe, King, Price & Becker

[57] ABSTRACT

An image display device comprises first and second polarizers having their planes of polarizations oriented at right angles to each other and an electrooptic plate of ferroelectric ceramic material interposed between the first and second polarizers. A matrix electrode arrangement is secured to one surface of the ceramic plate to cause crystallographic structural changes to occur under the influence of a locally generated electric field, so that light passing through the first polarizer is refracted by an amount proportional to the magnitude of the electric field and emerges from the second polarizer with an intensity proportional to the electric field. The electrode arrangement includes a plurality of row electrodes and a plurality of column electrodes to define a plurality of elemental picture areas. In each elemental area the electrode arrangement includes a diode, first parallel finger electrodes connected to a row electrode via the diode and second parallel finger electrodes connected to a column electrode and staggered relative to the first finger electrodes.

14 Claims, 13 Drawing Figures

IMAGE DISPLAY DEVICE UTILIZING BIREFRINGENCE PROPERTIES OF FERROELECTRIC CERAMIC MATERIAL

BACKGROUND OF THE INVENTION

The present invention relates to an image display device of the panel type which utilizes the birefringence properties of a ferroelectric material.

Many attempts have hitherto been made in panel type image display devices to improve their operating characteristics to meet the requirements of television systems. These devices include plasma display, liquid crystal display, electroluminescent display and electrochromic display panels. However, such displays have various limitations in performance and production. For example, plasma display devices, although satisfactory in color separation, have high operating voltages which make it difficult to design a compatible control circuit and adds complexity to production process. Electroluminescent displays are similarly operated on high voltages, and color rendition (except for orange) is poor. Liquid crystal and electrochromic display panels have limitations in response characteristics and excessively high temperature dependent characteristics.

Attempts have also been made recently to utilize the light scattering properties of a transparent ferroelectric material such as lead lanthanum zirconate titanate (PLZT) ceramic in panel display applications. The light scattering properties of the ceramic material are attributed to a change in crystal structure of the material under the influence of an electric field applied in the direction of thickness of the material. For example, a PLZT ceramic plate having a thickness of 200 micrometers requires the application of 200 volts or more to produce crystallographic structural change. Since conventional integrated circuits which are extensively used in various applications operate on voltages much lower than 200 volts, the electrode control circuit would require specially designed integrated circuits, resulting in an increase in production cost.

Another type of image display device is one which utilizes the birefringence properties of ferroelectric material. Such an image display device comprises first and second polarizers having their planes of polarizations oriented at right angles to each other and an electrooptic plate interposed between the polarizers with an electrode matrix being secured to the electrooptic plate. Although this birefringence type of display compares favorably with the light scattering type in terms of image contrast, undesirable "cross-coupling" occurs between non-selected matrix electrodes which tends to degrade the sharpness of reproduced images.

SUMMARY OF THE INVENTION

Accordingly, it is an object of the present invention to provide an image display device which produces a sharply defined image.

To achieve this object, the matrix electrode arrangement of the invention comprises a group of parallel row electrodes and a group of parallel column electrodes to define a plurality of elemental picture areas on the electrooptic plate which is disposed between two polarizers. In each of the elemental picture areas the electrode arrangement includes a unidirectional conductive element, first parallel finger electrodes connected to a row electrode through the unidirectional conductive element, and second parallel finger electrodes which are connected to a column electrode and staggered relative to the first finger electrodes. Because of the provision of the unidirectional conductive element, only the selected picture element is polarized to the exclusion of the other picture elements. Preferably, one of the second finger electrodes is positioned parallel to and close to an adjacent column electrode to serve as a shield between the intersecting row and column electrodes to eliminate the otherwise undesirable capacitances that tend to produce blurred images.

Another object of the invention is to provide an improved image display device which operates on relatively low voltages.

This object is achieved by an arrangement in which the first and second finger electrodes of each picture element are spaced a distance of from 15 to 100 micrometers. This arrangement also results in a lowering of the thickness of the electrooptic plate which in turn allows significant improvement in image contrast.

The electrooptic plate preferably comprises a ferroelectric ceramic material of $(Pb_{1-x}A_aB_b)(Zr_yTi_{1-y})_{1-(xO/4)}$3, where A represents a rare earth element selected from the group consisting of Nd and La, B represents an element selected from the group consisting of Na, K, Sr and Ba, x ranges from 0.09 to 0.11, y ranges from 0.6 to 0.8, and $a+b=x$, $a\neq 0$, and where the ceramic material maintains a single phase structure when an electric field is applied thereto. This material permits the device to respond quickly to rapid changes in voltage applied to the intersecting matrix electrodes.

BRIEF DESCRIPTION OF THE DRAWINGS

The invention will be further described by way of example with reference to the accompanying drawings, in which.

DETAILED DESCRIPTION

Figure 1:
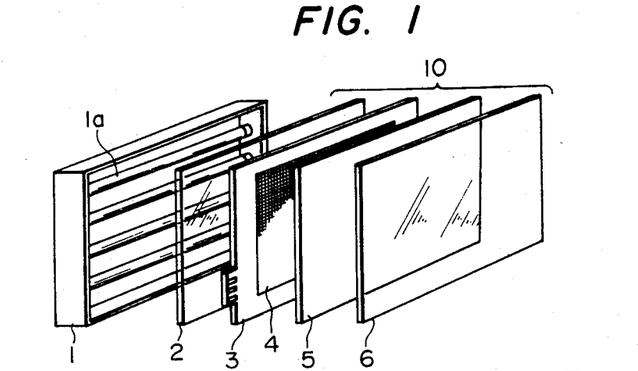
FIG. 1 is an illustration of an exploded broken perspective view of an image display device embodying the invention.
Figures 2, 3:
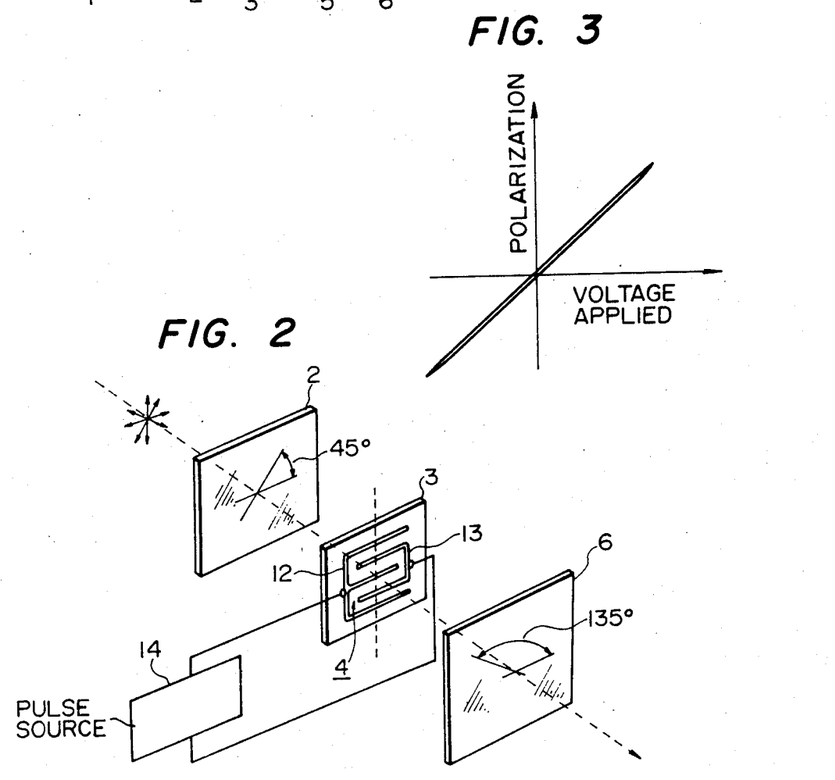
FIG. 2 is an illustration of a partial view in perspective of the arrangement of FIG. 1.
FIG. 3 is a graphic illustration of the ferroelectric polarization characteristic of the electrooptic ceramic material employed in the present invention.

In FIG. 1, an image display device 10 of the invention comprises a first polarizer 2, a transparent electrooptic plate 3 of a ferroelectric material on which a matrix electrode arrangement 4 is secured, a color filter 5 and a second polarizer 6. The display device 10 receives light from a light source 1 which comprises plural fluorescent lamps 1a having sharp intensities in the red, green and blue regions of the visible light spectrum. A light diffusing plate, not shown, may be placed on the light source to provide spatial distribution of light. The first and second polarizers 2 and 6 are arranged so that their axes of polarization are oriented at right angles to each other as illustrated in FIG. 2. The electrode arrangement 4 induces birefringence and light scattering in areas of electrooptical plate 3 where localized ferroelectric polarization is produced by longitudinal electric fields. For purposes of illustration, the matrix electrode which is exaggerated in FIG. 2 is shown as comprising a plurality of parallel finger electrodes 12 and 13 in opposed relation which are connected to a pulse source 14. The finger electrodes are oriented at 45° relative to the polarization axes of the first and second polarizers 2 and 6.

Because of the birefringence, or double refraction, of the ferroelectric material, the refracted light component undergoes a delay D which is represented as follows:

$$D = \Delta \bar{n} t \qquad (1)$$

$$\Delta \bar{n} = \tfrac{1}{2} n_1^3 . R . E^2 \qquad (2)$$

where, $\Delta \bar{n}$ is effective double refraction, t is the thickness of electrooptic plate 3, R is the second order electrooptical coefficient, $n_1$ is the refractive index of plate 3, and E is the voltage applied to the electrodes 12, 13.

The light passing through the first polarizer 2 undergoes a phase shift as it passes through the electrooptic plate 3 so that the amount of light output $I_{out}$ from the second polarizer 6 has the following relation with the input light $I_{in}$ to the first polarizer 2:

$$I_{out} = I_{in} \sin^2(D\pi/\lambda)$$

where, $\lambda$ is the wavelength of light incident on the first polarizer 2.

It is seen that the output light is at a minimum when the amount of delay D is an integral multiple "n" of wavelength $\lambda$, and at a maximum when $D = (n-\tfrac{1}{2})\lambda$, and thus a variation of the voltage applied to the finger electrodes 12, 13 results in a corresponding variation of the output light $I_{out}$.

The preferred material of the electrooptical plate 3 is a lead lanthanum zirconium titanate (PLZT) ceramic having a small amount of hysteresis as depicted in FIG. 3, because of its quick response characteristic. Although the ferroelectric polarization of this material has no hysteresis as a function of voltage applied thereto, the plate 3 can act as a capacitance to store electrical energy until it is discharged by a short circuit.

More specifically, the electrooptic plate 3 is composed of a ceramic $(Pb_{1-x}A_aB_b)(Zr_yTi_{1-y})_{1-(xO/4)3}$ where A represents a rare earth element selected from the group consisting of neodium (Nd) and lanthanum (La), B represents an element selected from the group consisting of sodium (Na), potassium (K), strontium (Sr) and barium (Ba), x ranges from 0.09 to 0.11, y ranges from 0.6 to 0.8, and $a + b = x (a \neq 0)$. This ceramic material is characterized by a single phase structure when electric field is applied. The addition of Na, K Sr and Ba is particularly advantageous since the threshold voltage of the plate 3 can be decreased to advantage for purposes of making electrode control circuitry.

Figure 4:
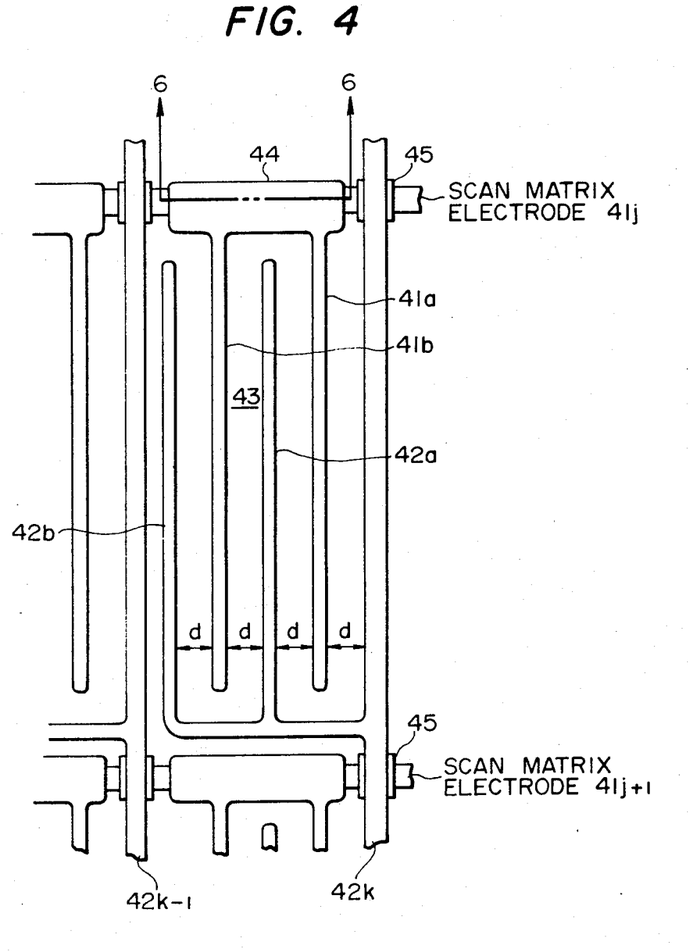
FIG. 4 is an illustration of an enlarged plan view of the matrix electrode arrangement according to the invention.

According to the present invention, the matrix electrode 4 of an image storage type comprises a plurality of scan electrodes $41_l \ldots 41_j \ldots 41_m$ and a plurality of signal electrodes $42_l \ldots 42_k \ldots 42_n$ which extend At right angles to the scan electrodes 41 to define a plurality of picture elements 43, only one of which is illustrated in FIG. 4. In each picture element is provided scan finger electrodes 41a and 41b which are coupled to the scan matrix electrode $41_j$ by an unidirectional conductive element or diode 44, and signal finger electrodes 42a and 42b which extend from a lower part of the signal matrix electrode $42_k$ at right angles to the scan matrix electrodes 41 and are bent upward to run parallel with the signal matrix electrodes 42. The finger electrodes 41a and 41b are staggered relative to the finger electrodes 42a and 42b so that the electrode 42b is close to the adjacent signal matrix electrode $42_{k-1}$. These comb-like finger electrodes are deposited on the mirror finished surface of the electrooptic plate 3 by vacuum evaporation of Al, Au or Au-Cr and the plate 3 is positioned so that the finger electrodes make an angle of 45° to the polarization planes of the first and second polarizers 2 and 6.

Because of this arrangement, the finger electrode 42b serves as a shield which prevents undesirable capacitive coupling between adjacent signal electrode $42_{k-1}$ and scan finger electrode 41b and further undesirable capacitive coupling between scan finger electrodes 41a, 41b and adjacent scan electrode $41_{j+1}$. Therefore, the scan matrix electrode $41_j$ is electrically isolated from the adjacent signal electrode $42_{k-1}$ and from the adjacent scan electrode $41_{j+1}$. As a result, a sharply defined, flicker-less image can be achieved.

At each intersection of scan and signal matrix electrodes is provided an insulative layer such as $SiO_2$ to provide electrical isolation therebetween. In a practical embodiment, the isolating layer 45 may be extended to cover the surface of the diodes 44 which are arranged on a single scan electrode 41.

In operation, with the scan matrix electrode $41_j$ being maintained at a given potential, the signal matrix electrodes $42_l$ to $42_n$ are successively applied with signal voltages, so that those areas of the underlying electrooptical material which are arranged parallel with the electrode $41_j$ are successively ferroelectrically polarized in proportion to the magnitude of the applied signal voltages. Light passing through the polarized areas undergoes double refraction and is allowed to pass through the second polarizer 6 in proportion to the localized ferroelectric polarization.

Figure 5:
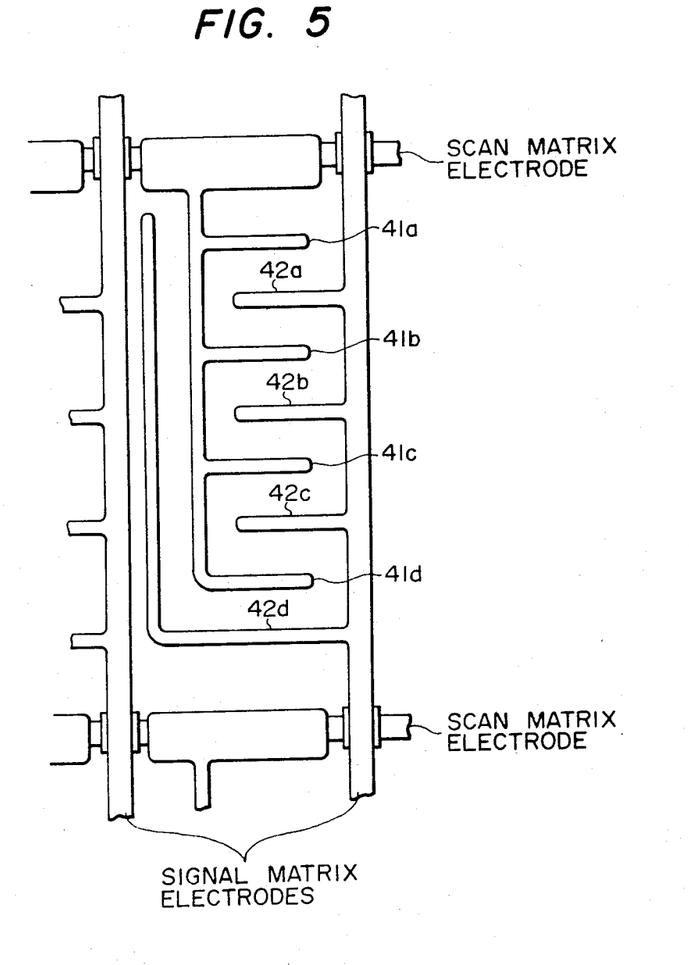
FIG. 5 is an illustration of an alternative arrangement of the matrix electrode of FIG. 4.

An alternative arrangement of the finger electrodes is illustrated in FIG. 5 in which scan finger electrodes 41a, 41b, 41c and 41d extend parallel with the scan matrix electrodes 41 and are staggered relative to signal finger electrodes 42a, 42b, 42c and 42d, with the finger electrode 42d being bent upward to extend between adjacent signal matrix electrode $42_{k-1}$ and the web portion of scan finger electrodes 41a to 41d. In this alternative arrangement, the finger electrode 42d serves as a shield between the scan and signal matrix electrodes 41 and 42.

The diode 44, when forward biased, provides coupling between the scanned matrix electrode 41 and its finger electrodes 41a, 41b so that only one picture element is excited. When reverse biased, the diode provides isolation between these electrodes as long as it remains nonconductive so, that picture elements other than the polarized area are free from undesirable cross-coupling and as a result a clear, high contrast image is obtained.

Figure 6A:
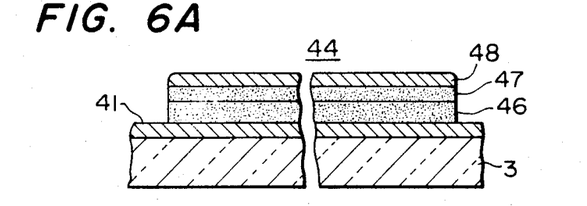
FIGS. 6A and 6B are illustrations of cross-sectional views taken along the line 6—6 of FIG. 4.

A shown in FIG. 6A, this diode essentially comprises laminated layers 46 and 47 of selenium and tellurium, respectively, which are vacuum evaporated on the scan matrix electrode 41. The upper surface of the tellurium layer 47 is covered by a vacuum evaporated metal layer 48 which forms the web portion of the scan finger electrodes. Typically, the laminated layer 46 and 47 are prepared by evaporating selenium powder containing 0.2 to 10.0 weight percent of iodine powder under pressure of $10^{-6}$ Torr. or more vacuum, and then evaporating tellurium under vacuum or argon environment followed by a thermal treatment. This thermal treatment involves incremental temperature rises to about 180° C. to allow the evaporated selenium to crystalize from an amorphous state. After crystallization of the selenium layer, the scan finger electrodes are vacuum evaporated.

Figure 6B:
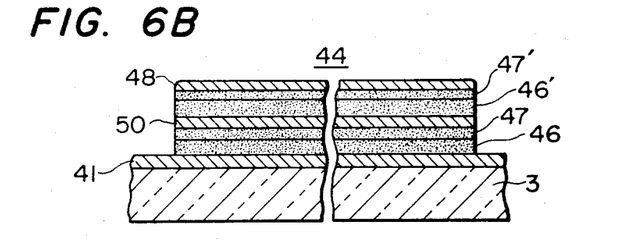

A number of experiments were conducted with devices according to the invention. During these experiments it was found preferable that the diode 44 have a breakdown voltage of more than 60 volts and a forward resistance of $10^3$ ohms/mm$^2$ and a resistance of $10^6$ ohms/mm$^2$ under reverse bias condition. FIG. 6B shows a preferred form of the diode construction which includes an additional set of layers 46' and 47' over the first set of layer 46 and 47 with an intermediate ohmic layer 50 therebetween. The web portion 48 of finger electrodes 41 is provided on the upper surface of the tellurim layer 47'. The diode construction of FIG. 6B provides a breakdown voltage of 100 volts.

In accordance with a further aspect of the invention, the image display device 10 permits the use of mass-produced, low-voltage type integrated circuits which drive the matrix electrodes 41 and 42. This is accomplished by the combination of the aforesaid ferroelectric material and the staggered finger electrodes which are spaced apart by a distance "d" in a range of 15 to 100 micrometers. This range of spacing "d" was confirmed by experiments in which a ferroelectric plate 200 micrometers thick of $(Pb_{0.91}La_{0.09})(Zr_{0.65}Ti_{0.35})O_3$ was employed and tests were conducted with respect to electrode spacings of 8, 15, 70, 100 and 150 micrometers.

Figure 7:
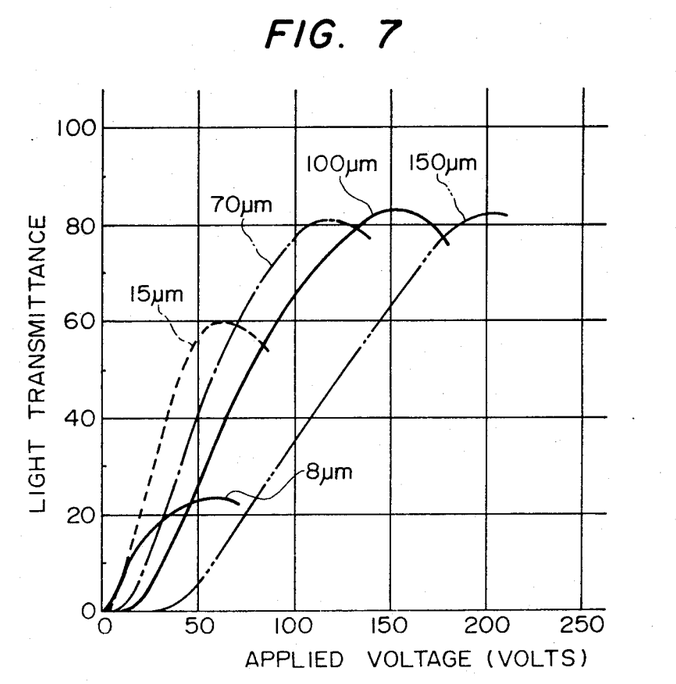
FIG. 7 is a graphic illustration of the light transmittance characteristics of the ceramic plate as a function of applied voltage with finger electrode spacings as parameters.

As graphically illustrated in FIG. 7, the light transmittance of the ferroelectric plate 3 as measured on the output side of the second polarizer 6 is plotted as a function of voltage applied to the electrodes 41 and 42 with the finger electrode spacing "d" as parameters. It is seen that for an electrode spacing of 8 micrometers the light transmittance is quite poor although the operating voltage is low. On the other hand, satisfactory values of light transmittance are obtained for a range of electrode spacings from 15 to 150 micrometers with the operating voltage of up to 180 volts.

Figure 8:
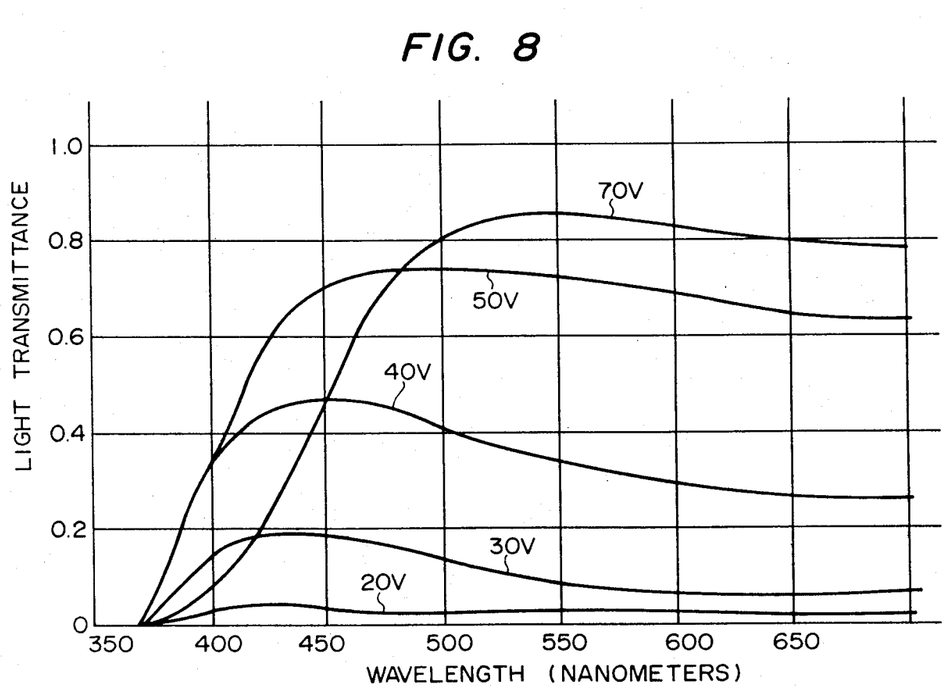
FIGS. 8 and 9 are graphic illustrations of the light transmittance characteristics of the ceramic plate as a function of wavelength of light with the applied voltages as parameters.
Figure 9:
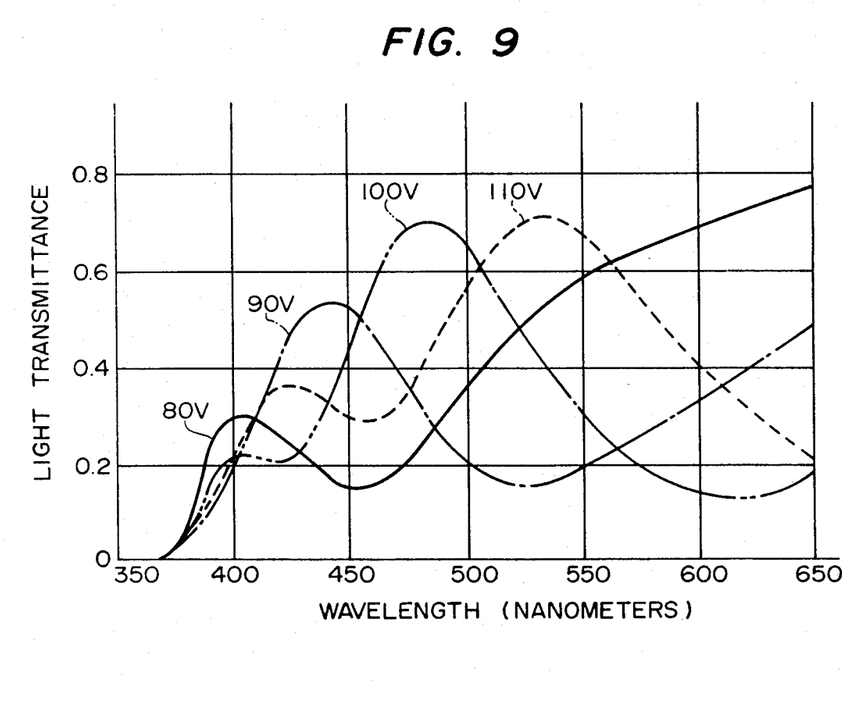

Further experiments were conducted to determine the relationship between light transmittance and wavelength of light using electrode voltages as operating parameters. In these experiments the aforesaid PLZT plate of 200 micrometers thick with an electrode spacing "d" of 50 micrometers was employed. As shown in FIG. 8, for an operating voltage range of up to 70 volts, the light transmittance is roughly flat over the red, green and blue regions of the spectrum. On the other hand, FIG. 9 shows that for an operating voltage equal to or higher than 80 volts, the light transmittance fluctuates significantly over the red, green and blue regions. This is undesirable for reproduction of a color image.

It follows from the foregoing that the usable value of finger electrode spacings "d" is in a range from 15 to 100 micrometers, and preferably is in a range between 30 and 70 micrometers. It was further confirmed experimentally that the thickness of the ferroelectric plate 3 is equal to or greater than three times the value of electrode spacing "d". The usable thickness value of ferroelectric plate 3 ranges from 45 to 500 micrometers.

Figure 10:
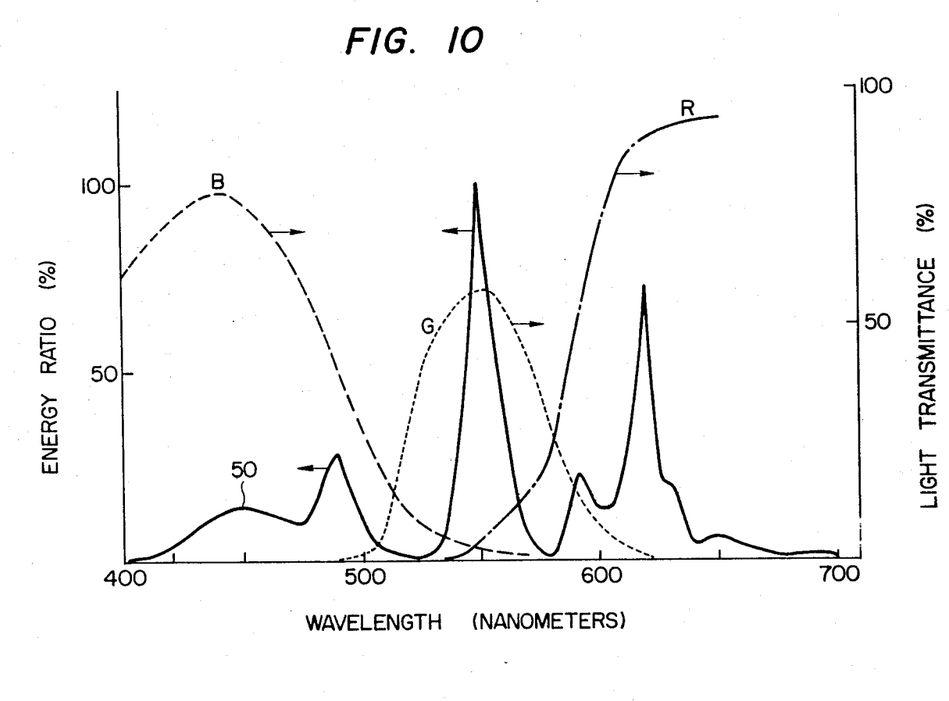
FIG. 10 is a graphic illustration of the light transmittance characteristics of the color filter used in the invention as a function of light wavelength and the radiation energy ratio, or spectral intensity of light from the light source.

Satisfactory color reproduction is accomplished by the use of a color filter having light transmittance characteristics as indicated by broken-line curves R, G and B in FIG. 10 in combination with a light source having a spectral intensity characteristic as indicated by a solid-line curve 50. The radiation energy ratio of the light source is negligibly small in areas between peaks at different wavelengths. This permits excellent color separation and correction of light transmittance with respect to each primary color. The difference in light transmittance characteristics of the color filter shown in FIG. 10 can be corrected by the use of a light source having the highest intensity in the blue region with a medium intensity in the green region and a lowest intensity in the red region. This intensity correction results in excellent color reproduction.

Figures 11, 12:
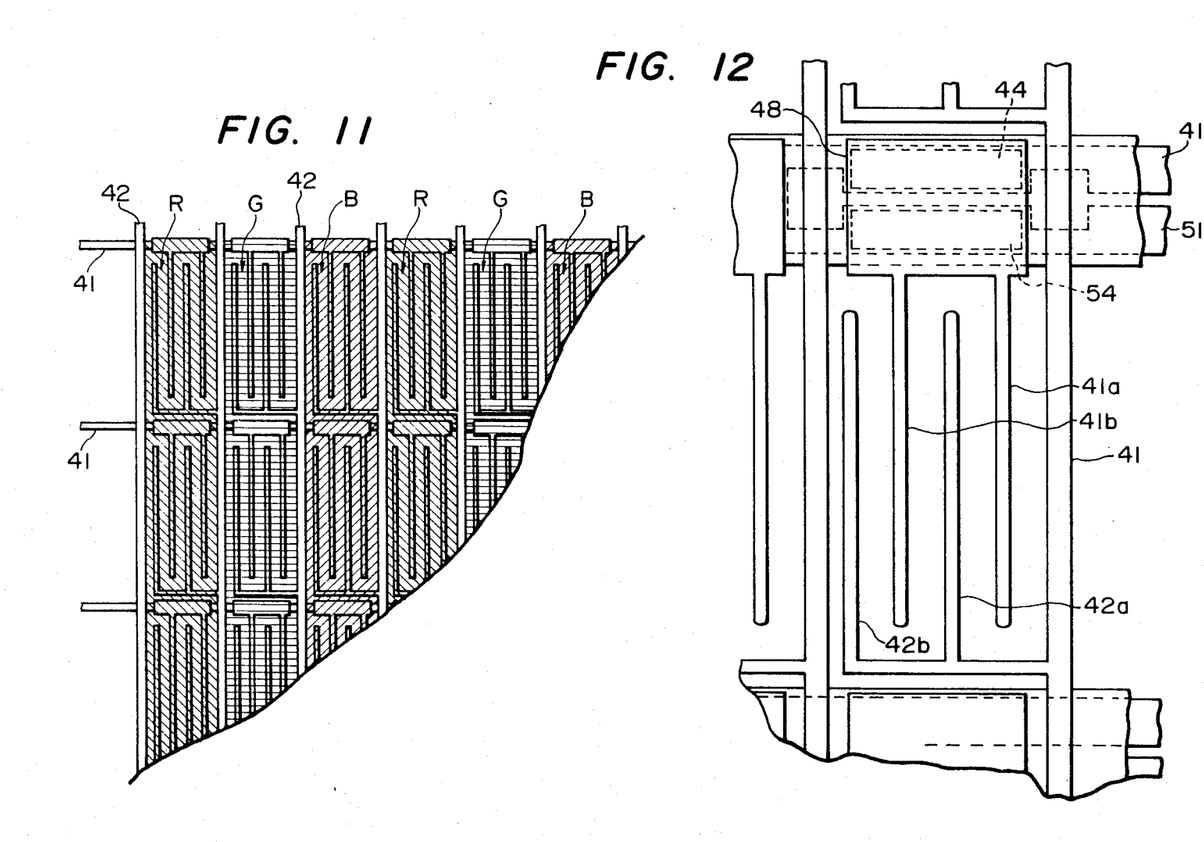
FIG. 11 is an illustration of the color filter overlying the matrix electrode arrangement.
FIG. 12 is an illustration of a modification of the electrode arrangement of FIG. 4 useful for writing and erasing operations.

One example of the color filter 5 is shown in FIG. 11 in overlapped relation with the matrix electrode 4. A series of recurrent triplets of red, green and blue color stripes designated R, G and B, respectively, is provided so that each stripe is in registry with each series of vertically arranged picture elements defined by adjacent electrodes 42. The light transmittance of a desired primary color is thus controlled by a signal applied to the associated signal matrix electrode 42 by simultaneous application of a potential to the associated scan matrix electrode 41.

An organic color filter is preferred because color stripes can be printed by a screen method with a precision of within several micrometers on the surface of the electrooptic plate 3 opposite to the matrix electrode 4.

FIG. 12 is an illustration of a modified electrode arrangement which permits an image to be erased after writing operation, rather than to store the image for an extended period of time. This electrode arrangement differs from the FIG. 4 arrangement in that it further includes an erase electrode 51 which extends parallel with and adjacent to the writing scan matrix electrode 41 and an erase diode 54 overlying the erase electrode 51. The web portion 48 of the scan finger electrodes 41a, 41b overlies the diodes 44 and 54 to serve as a common electrode for writing and erasing operations. The erase diode 54 is fabricated so that it is poled in opposite sense to the writing diode 41. The erasing operation is accomplished by the application of a voltage across the electrodes 51 and 42 to forward bias the erasing diode 54 but reverse bias the writing diode 41. All the storage images can be erased by simultaneous application of erase potentials to all the erase electrodes 51 and to all the signal electrodes 42. Of course, it is possible to erase a desired picture element or elements by addressing specified matrix electrodes.

The interval between writing and erasing operations can be set to 33 milliseconds in the case of an animation motion picture. Because of the image retaining capability of the electrooptic plate 3, an image of sufficient brightness is obtained. With the value of 33 milliseconds being assumed to be selected as the writing and erasing interval for the NTSC or PAL television system, it is necessary that the writing operation for each scan line image must be accomplished within an interval smaller than 64 microseconds. Since the Te-Se diode as previously described is capable of providing a switching action within the interval of less than a few microseconds, the image display device 10 of the invention proves satisfactory in television systems.

A further advantage of the invention resides in the fact that the elimination of undesirable capacitances across matrix electrodes not only results in a sharply defined image, but improves the image contrast. Furthermore, since the image contrast is an inverse function of the thickness of electrooptic plate 3 that is in turn a function of the electrode spacing "d" as described above, the present invention provides an image contrast of more than 100:1 by appropriately proportioning the value of spacing "d" in relation to the thickness of plate 3.

Various modifications are apparent to those skilled in the art without departing from the scope of the invention which is only limited by the appended claims. For example, the diodes 44 could be replaced with switching elements such as field effect transistors or thin film transistors (Cds or Pbs) in so far as they provide a quick response diode action.

What is claimed is:

1. An image display device comprising:
   first and second polarizers having their planes of polarization oriented at right angles to each other;
   a transparent electrooptic plate of ferroelectric material between said first and second polarizers; and
   a matrix electrode arrangement secured to one surface of said electrooptic plate including a plurality of parallel rows of electrodes and a plurality of parallel columns of electrodes to define a plurality of elemental areas on said electrooptic plate, said matrix arrangement further including in each of said elemental areas first parallel finger electrodes connected in circuit with a said row electrode and second parallel finger electrodes connected to a said column electrode, and a unidirectionally conductive means connected between said first finger electrodes and the said row electrode for reducing cross coupling between plural elemental areas defined by the said row electrode, said first and second finger electrodes being interleaved with each other and oriented at 45 degrees to the planes of orientation of said first and second polarizers.

2. An image display device as claimed in claim 1, wherein one of said second finger electrodes in one elemental area comprises a segment parallel to and close to the column electrode to which the second finger electrodes of an adjacent elemental area are connected, for reduction of capacitive coupling between, and thereby isolation of, said first finger electrodes in said one elemental area from the column electrode of said adjacent elemental area.

3. An image display device as claimed in claim 1, wherein said interleaved finger electrodes are spaced apart from each other by a distance of from 15 micrometers to 100 micrometers.

4. An image display device as claimed in claim 1, 2 or 3, wherein said electrooptic plate is formed of a ceramic material comprising $(Pb_{1-x}A_aB_b)(Zr_yTi_{1-y})_{1-(x0/4)}3$, where A represents a rare earth element selected from the group consisting of Nd and La, B represents an element selected from the group consisting of Na, K, Sr and Ba, x ranges from 0.09 to 0.11, y ranges from 0.6 to 0.8, and $a+b=x$, $a\neq 0$, said ceramic material maintaining a single phase structure when electric field is applied.

5. An image display device as claimed in claim 1, 2 or 3, wherein said unidirectionally conductive means is mounted on a said row electrode.

6. An image display device as claimed in claim 5, wherein said unidirectionally conductive means comprises a semiconductor switching device providing a diode action.

7. An image display device as claimed in claim 4, wherein the thickness of said electrooptic plate is at least three times said distance between said first and second finger electrodes.

8. An image display device as claimed in claim 1, wherein said matrix electrode further comprises second parallel rows of electrodes parallel to and close to the first-mentioned row electrodes, and wherein each of said elemental areas further includes a second unidirectionally conductive means having a direction of conductivity opposite to the direction of conductivity of the first-mentioned unidirectionally conductive means, and a said second row electrode for applying an image erasing signal to said elemental area through said second unidirectional conducting means, said first finger electrodes being connected to the said second row electrode through said second unidirectionally conductive means.

9. An image display device as claimed in claim 1 or 8, further comprising a color filter adjacent to said electrooptic plate, said color filter including a plurality of recurrent groups of filter stripes of primary colors.

10. An image display device as claimed in claim 9, wherein each of said filter stripes is in registry with the elemental areas of said matrix electrode arranged in series between adjacent electrodes of one of said first and second groups.

11. An image display device as claimed in claim 10, further comprising a light source for emitting light having peak intensities respectively in the wavelengths of the primary colors of said color filter.

12. An image display device as claimed in claim 8 wherein said second unidirectional conducting means includes an electrode common with said first unidirectional conducting means, said first finger electrodes being connected to said common electrode.

13. An image display device as claimed in either claims 1 or 8, wherein said unidirectionally conductive means comprises layers of selenium and tellerium formed on said row electrode, and a metal layer for connection to said first finger electrodes.

14. An image display device as claimed in claim 13 wherein said unidirectional conducting means further comprises an ohmic layer atop said layer of tellurium, and second layers of selenium and tellurium between said ohmic layer and said metal layer.

* * * * *

UNITED STATES PATENT OFFICE
CERTIFICATE OF CORRECTION

Patent No. 4,379,621　　　　　　　　Dated April 12, 1983

Inventor(s) Masaru Ikedo, Masafumi Watari, Yoshitake Yasuno, and Tadaoki Yamashita It is certified that error appears in the above-identified patent and that said Letters Patent are hereby corrected as shown below:

Column 2, lines 22 and 23, change "$(Pb_{1-x}A_aB_b)(Zr_yTi_{1-y})_{1-(xO/4)}3$" to --$(Pb_{1-x}A_aB_b)(Zr_yTi_{1-y})_{1-(x/4)}O_3$--.

Column 3, line 65, change "$(Pb_{1-x}A_aB_b)(Zr_yTi_{1-y})_{1-(xO/4)}3$" to --$(Pb_{1-x}A_aB_b)(Zr_yTi_{1-y})_{1-(x/4)}O_3$--.

IN THE CLAIMS:

Claim 4, line 3, change "$(Pb_{1-x}A_aB_b)(Zr_yTi_{1-y})_{1-(xO/4)}3$" to --$(Pb_{1-x}A_aB_b)(Zr_yTi_{1-y})_{1-(x/4)}O_3$--.

Signed and Sealed this

Ninth Day of August 1983

[SEAL]

Attest:

GERALD J. MOSSINGHOFF

Attesting Officer　　Commissioner of Patents and Trademarks